United States Patent [19]

Bauder

[11] Patent Number: 4,524,979
[45] Date of Patent: Jun. 25, 1985

[54] CYLINDER HEAD GASKET FOR INTERNAL COMBUSTION ENGINES

[75] Inventor: Armin Bauder, Neckarsulm, Fed. Rep. of Germany

[73] Assignee: Audi NSU Auto Union Aktiengesellschaft, Fed. Rep. of Germany

[21] Appl. No.: 620,628

[22] Filed: Jun. 14, 1984

[30] Foreign Application Priority Data

Jun. 14, 1983 [DE] Fed. Rep. of Germany ....... 3321425

[51] Int. Cl.³ ............................................. F21B 5/00
[52] U.S. Cl. ................................... 277/189; 277/235 B
[58] Field of Search .................... 277/235 B, 189, 11

[56] References Cited
U.S. PATENT DOCUMENTS

| | | | |
|---|---|---|---|
| 1,116,609 | 11/1914 | Schuermann | 277/189 |
| 1,884,879 | 10/1932 | Sanders | 277/189 |
| 3,063,439 | 11/1962 | Kessel | 277/189 |
| 3,340,774 | 9/1967 | Brenneke | 277/11 |
| 3,654,382 | 4/1972 | Rubright | 277/189 |

Primary Examiner—Robert I. Smith
Attorney, Agent, or Firm—Kane, Dalsimer, Kane, Sullivan and Kurucz

[57] ABSTRACT

A cylinder head gasket for internal combustion engines is fixed in position in the cylinder block and/or the cylinder head. Elements fixedly connected with the gasket are shaped that they are adapted to coact with bores in the cylinder block and/or the cylinder head in a frictionally connected manner. The elements are bushings which penetrate the gasket and protrude therefrom at least on one side thereof. The bushings have flanges engaging on both sides of the gasket and adapted to extend into the bores in a radial direction and in a flexible manner.

6 Claims, 4 Drawing Figures

CYLINDER HEAD GASKET FOR INTERNAL COMBUSTION ENGINES

BACKGROUND OF THE INVENTION

The present invention relates to a cylinder head gasket for piston engines, in particular internal combustion engines fixed in position by elements which engage with surfaces of bores in the cylinder block and/or the cylinder head. Cylinder head gaskets of this type are known from DE-OS No. 29 11 683.

Elements used for retaining the cylinder head gasket in position have been precisionally ground and hardened set pins which are driven into corresponding bores in the cylinder block face. Thereafter, the cylinder head gasket is mounted with corresponding openings onto the set pins which protrude from the cylinder block face. Then the cylinder block is mounted and the cylinder block is screwed together with the cylinder head. The bores in the cylinder head gasket which receive the set pins may have only relatively small tolerances as far as their diameter is concerned with respect to the diameter of the set pins. In this manner, the accuracy of the fixed position is not compromised which is required in internal combustion engines with low rib tolerances between adjacent cylinders.

Finally, due to the fact that the cylinder head gaskets are normally delivered in a curved state for assembly, as a result of manufacture and transport, relatively long set pins and correspondingly deep bores are required.

It should be obvious that the fixing of the position of the cylinder head gasket requires a substantial amount of effort. Long or deep set pins and bores with a relative high degree of precision must be made. The set pins must be driven without causing a deformation which could impair the subsequent mounting of the cylinder head gasket, and the bores in the cylinder head gasket for receiving the set pins must also have a substantially tight tolerance.

SUMMARY OF THE INVENTION

It is therefore an object of the invention to provide a cylinder head gasket which can be fixed in its position with substantially less effort. This object is achieved with the present invention by providing fixing elements which are fixedly connected with the gasket and are so shaped that they coact with the bores in a frictional manner.

Therefore, the fixing elements can be mounted during the assembly of the cylinder head gasket, whereby the assembly operation during the assembly of the piston engine is substantially simplified. In this connection, the cylinder head gasket may be mounted on the cylinder block in such a manner that the fixing elements mounted on the gasket are flush with the bores in the cylinder block and then pressed into the bores. These bores do not have to be deep since the fixing elements may be relatively short. The finishing operation is shortened due to the lesser depth of these bores. A further advantage of the invention is evident during assembly of the cylinder head gasket because one cannot forget to insert a given set pin which has happened heretofore and which may result in damaging of the gasket.

Preferably, the fixing elements are shaped as bushings which penetrate the gasket and protrude therefrom at least at one side thereof. The fixing bushings engage on both sides of the gasket with flanges or collar-like edges which extend in a radial direction and in a flexible manner. The fixing bushings may be extrusion molded or centrifugal molded parts and may be mounted in one operating step normally surrounding the cylinder bores (see for example DE-AS No. 17 50 622). Since the fixing bushings have fulfilled their task after the assembly, they may also be of a plastic material and may be shaped, for example, like a champagne cork or may be provided with projections which are distributed over the circumference thereof and coact in a friction fit with the wall of the bore.

BRIEF DESCRIPTION OF THE DRAWINGS

Some exemplified embodiments of the invention will now be described in conjunction with the drawings. In the drawings.

DESCRIPTION OF THE PREFERRED EMBODIMENT

Figure 1:
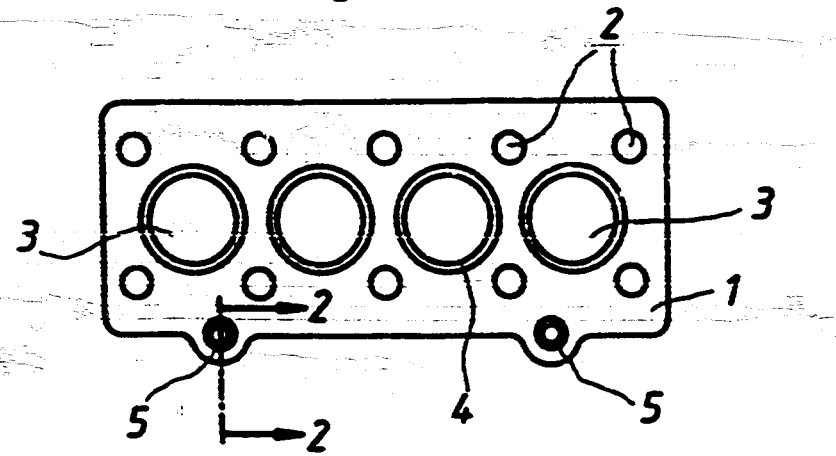
FIG. 1 is a plan view of a cylinder head gasket.

The cylinder head gasket illustrated in FIG. 1 includes a plate 1 made of a heat resistant, relatively soft material with openings 2 which correspond to openings in the cylinder head and cylinder block, not shown, to permit passage of cooling liquid through openings 3 which correspond with the cylinder bores. The edges of openings 3 are provided with metallic borders 4 which protect the material of plate 1 from hot combustion gases.

Figure 2:
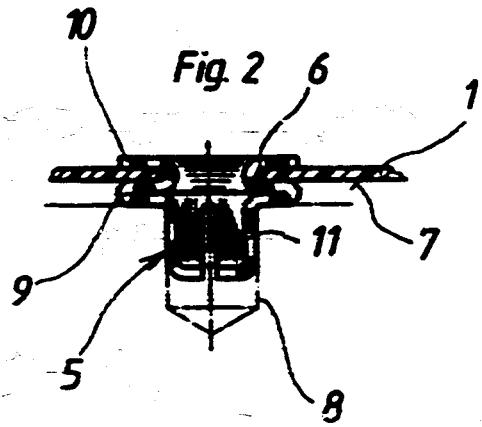
FIG. 2 is a sectional view along line 2—2 in FIG. 1.

Two fixing bushings 5 are provided in the exemplified embodiment for fixing the position of the cylinder head gasket on the cylinder block, one of which is illustrated in an enlarged dimension in FIG. 2. Fixing bushing 5 is a metallic extrusion molded or centrifugal molded part which penetrates a bore 6 in plate 1 and extends from the lower side 7 of the plate downwardly. In the assembled state fixing bushing 5 extends into a bore 8 in the cylinder block as indicated by the dash-dotted line. The fixing bushing 5 encompasses the edge of opening 6 with upset or flanged edges 9 and 10 and is thereby fixedly connected with plate 1. Thereafter, the cylinder head gasket may merely be mounted on the cylinder block with the downwardly protruding cylindrical fixing bushings 5 in such a manner that the bushings 5 penetrate into the bores 8. Accordingly, the required position fixing of the cylinder head gasket with respect to the cylinder block is obtained, as to assure the flush arrangement of openings 2 and 3 with respect to the corresponding conduits or cylinder bores in the cylinder block or in the cylinder head.

The area of bushing 5 which extends into the bore 8 has an outer diameter which is slightly larger than the bore 8 and is provided with at least one longitudinal slot 11, which provides flexibility of this area in a radial direction. Thus, bushing 5 is fixedly clamped with the bore 8 during the insertion operation and plate 1 is retained in a planar position.

Figure 3:
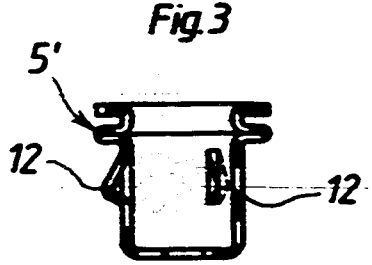
FIG. 3 is a longitudinal sectional view of a fixing bushing of a second embodiment.

The fixing bushing 5' of FIG. 3 is provided with radial stamped out yielding projection 12 at the area extending into the bore 8, so that bushing 5' is retained in the bore 8 by means of a friction fit.

Figure 4:
FIG. 4 is a side view of a fixing element of a third embodiment.

In the exemplified embodiment of FIG. 4, the area of fixing element 5" which extends into the bore 8 is provided with radial circumferential ribs 13 in the manner of a champagne cork which provide a friction fit with the walls of the bore. Elements 5'' of this embodiment may be made from plastic material. Instead of circumferential ribs one could provide longitudinal ribs or spot like protrusions.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A cylinder head gasket for disposition between a cylinder head and a cylinder block of an internal combustion engine, said cylinder head and block having corresponding cylinder bores, coolant bores for a liquid coolant, and one of said cylinder head and cylinder block having gasket bores, said gasket comprising:

a plate with openings corresponding to said cylinder and coolant bores; and elements corresponding to said gasket bores, said elements being affixed to said plate and being shaped to frictionally engage said gasket bores thereby positioning said gasket.

2. A cylinder head gasket in accordance with claim 1, in which the elements are bushings which penetrate the gasket and protrude therefrom at least on one side thereof, the bushings having flanges engaging on both sides of the gasket and adapted to extend into the gasket bores said bushings being flexible in the radial direction.

3. A cylinder head gasket in accordance with claim 2, in which the bushings are provided with at least one longitudinal slot extending into the gasket bores.

4. A cylinder head gasket in accordance with claim 2, in which the bushing is provided with at least three projections which are adapted to yield in a radial direction with the bore.

5. A cylinder head gasket in accordance with claim 3 wherein said bushings are hollow.

6. A cylinder head gasket in accordance with claim 1, in which the elements are provided with radial protruding ribs extending on the outer face thereof.

* * * * *